United States Patent
Haastrup

(10) Patent No.: US 11,688,387 B2
(45) Date of Patent: Jun. 27, 2023

(54) HEARING APPARATUS AND RELATED METHODS FOR EVALUATION OF SPEECH EXPOSURE

(71) Applicant: GN HEARING A/S, Ballerup (DK)

(72) Inventor: Astrid Haastrup, Solrød Strand (DK)

(73) Assignee: GN HEARING A/S, Ballerup (DK)

( * ) Notice: Subject to any disclaimer, the term of this patent is extended or adjusted under 35 U.S.C. 154(b) by 586 days.

(21) Appl. No.: 16/802,500

(22) Filed: Feb. 26, 2020

(65) Prior Publication Data
US 2020/0193968 A1 Jun. 18, 2020

Related U.S. Application Data

(63) Continuation of application No. PCT/EP2018/076305, filed on Sep. 27, 2018.

(30) Foreign Application Priority Data

Sep. 27, 2017 (EP) .................................. 17193381

(51) Int. Cl.
*G10L 15/05* (2013.01)
*H04R 1/32* (2006.01)
*G10L 17/00* (2013.01)

(52) U.S. Cl.
CPC .............. *G10L 15/05* (2013.01); *G10L 17/00* (2013.01); *H04R 1/326* (2013.01)

(58) Field of Classification Search
CPC ......... G10L 15/05; G10L 17/00; H04R 1/326; H04R 1/34; H04R 1/40; H04R 1/32; H04R 2225/55; H04R 25/00; H04R 2225/41; A61N 1/36038; A61N 5/0622
See application file for complete search history.

(56) References Cited

U.S. PATENT DOCUMENTS

| 6,088,669 A * | 7/2000 | Maes ...................... G10L 17/00 704/251 |
| 9,729,994 B1 * | 8/2017 | Eddins ..................... H04S 7/304 |
| 2003/0158735 A1 * | 8/2003 | Yamada .................. G10L 13/00 704/260 |
| 2009/0304187 A1 | 12/2009 | Dittberner |
| 2014/0336448 A1 | 11/2014 | Banna |

(Continued)

FOREIGN PATENT DOCUMENTS

| CN | 101236617 | 8/2008 |
| CN | 101433098 | 5/2009 |

(Continued)

OTHER PUBLICATIONS

Foreign office Action issued for Chinese Patent Application No. 201880063027.1 dated Feb. 3, 2021.

(Continued)

*Primary Examiner* — Huyen X Vo
(74) *Attorney, Agent, or Firm* — Vista IP Law Group, LLP

(57) ABSTRACT

A hearing apparatus includes: a receiving unit configured to obtain a first speech signal; a processor configured to provide of an electrical output signal based on the first speech signal; and a receiver for providing an audio output signal based on the electrical output signal; wherein the hearing apparatus is configured to determine a first word count of the first speech signal, and update a total word count based on the first word count.

24 Claims, 7 Drawing Sheets

(56) References Cited

U.S. PATENT DOCUMENTS

| | | | |
|---|---|---|---|
| 2015/0036850 A1* | 2/2015 | Barthel | H04R 25/40 |
| | | | 381/313 |
| 2016/0379671 A1 | 12/2016 | Lacson | |
| 2017/0017394 A1* | 1/2017 | Wang | H04L 1/1819 |
| 2017/0206914 A1 | 7/2017 | Engelke et al. | |
| 2019/0014422 A1* | 1/2019 | Lunner | H04R 25/554 |

FOREIGN PATENT DOCUMENTS

| | | |
|---|---|---|
| CN | 104038864 | 9/2014 |
| CN | 106897950 | 6/2017 |
| JP | 2009223547 | 10/2009 |

OTHER PUBLICATIONS

English translation of OA for Chinese Patent Application No. 201880063027.1 dated Feb. 3, 2021.

Ling Le et al., "Investigation and Analysis of Related Factors of Neonatal Hearing Impairment, Fundamental Research", dated Dec. 1, 2007.

A. Banerjee, et al., "Application of electrooculography to estimate word count while reading text", dated May 1, 2017.

Extended European Search Report dated Jun. 14, 2018 for corresponding EP Application No. 17193381.5.

Partial Search Report dated Sep. 13, 2018 for corresponding International PCT Application No. PCT/EP2018/076305, 15 Pages.

International Search Report and Written Opinion dated Jan. 24, 2019 for corresponding International PCT Application No. PCT/EP2018/076305, 18 Pages.

\* cited by examiner

HEARING APPARATUS AND RELATED METHODS FOR EVALUATION OF SPEECH EXPOSURE

RELATED APPLICATION DATA

This application is a continuation of International Patent Application No. PCT/EP2018/076305 filed on Sep. 27, 2018, pending, which claims priority to European Patent Application No. 17193381.5 filed on Sep. 27, 2017. The entire disclosures of the above applications are expressly incorporated by reference herein.

FIELD

The disclosure relates to a hearing apparatus and related methods, e.g. for evaluating or monitoring a user's exposure to speech. Also disclosed is a system and an apparatus for enhancing hearing experience of the hearing impaired.

BACKGROUND

While data varies, at least one baby per 1,000 newborns has a hearing loss. In addition to congenital hearing loss, hearing loss may be acquired during child's first years. In this context, children begin learning to speak from the day they are born. As is known, by the age of three, they need to hear approximately 30 000 words a day to develop sufficient language skills. In particular, children need to hear speech and subsequently practice in order to develop their own articulation and ultimately learn how to construct sentences. Deficiencies at early stage of language development are difficult to overcome later on in life.

Here, it is not uncommon that parents and relatives of the hearing-impaired child begin to speak less and less or downright stop talking to the child on learning that the child has a hearing impairment. Accordingly, the knowledge of the child's handicap works against the child's needs.

SUMMARY

Accordingly, it is an object of the present disclosure to at least alleviate above-identified and other drawbacks associated with the current art.

The above stated objective is achieved by means of the method and the apparatus as disclosed herein including the claims and items.

A method for operating a hearing apparatus is disclosed, the method comprising obtaining a first speech signal; determining a first word count of the first speech signal; updating a total word count based on the first word count; providing an electrical output signal based on the first speech signal and/or an input signal; and converting the electrical output signal to an audio output signal.

Also disclosed is a hearing apparatus comprising a receiving unit for obtaining a first speech signal; a processor configured for provision of an electrical output signal based on the first speech signal; and a receiver for converting the electrical output signal to an audio output signal, wherein the hearing apparatus is configured to perform the method or at least parts of the method as disclosed herein.

Further, a hearing apparatus is discloses, the hearing apparatus comprising a receiving unit for obtaining a first speech signal; a processor configured for provision of an electrical output signal based on the first speech signal; and a receiver for converting the electrical output signal to an audio output signal, wherein the processor is configured to determine a first word count of the first speech signal; update a total word count based on the first word count; and processing the first speech signal and/or an input signal for provision of an electrical output signal.

In addition, the present disclosure provides a method, e.g. for enhancing hearing experience for the hearing impaired, the method comprising the steps of receiving speech signal by means of a hearing apparatus, determining word count of the received speech signal, determining a total/cumulative word count associated with the speech signals received by the hearing apparatus, processing the received speech signal in the hearing apparatus, and reproducing the processed speech signal by means of a loudspeaker of the hearing apparatus.

The present disclosure entails that the number of words which the user, e.g. hearing-impaired child, is exposed to may be tracked. More specifically, the word count of the ongoing speech signal is continuously added to the total/cumulative or total word count associated with the earlier speeches received by the hearing apparatus of the child. Here, the tracked exposure period would typically span between awakening of the child until his/hers falling to sleep. Advantageously, the parents of the hearing-impaired child and/or hearing care professionals may hereby gain increased knowledge of one vital characteristic of the child's auditory day. Hereby, it becomes easier to determine when additional exposure to spoken words is necessary. In a related context, it may easily and swiftly be determined at the end of the day whether the hearing-impaired child has been exposed to a sufficient number of words. In this way, it may be facilitated that the child develops its language skills at a normal pace in spite of the impairment.

It is an important advantage of the present disclosure that a user's exposure to speech can be effectively monitored.

Further advantages and features of embodiments will become apparent when reading the following detailed description in conjunction with the drawings.

DETAILED DESCRIPTION

Figure 1:
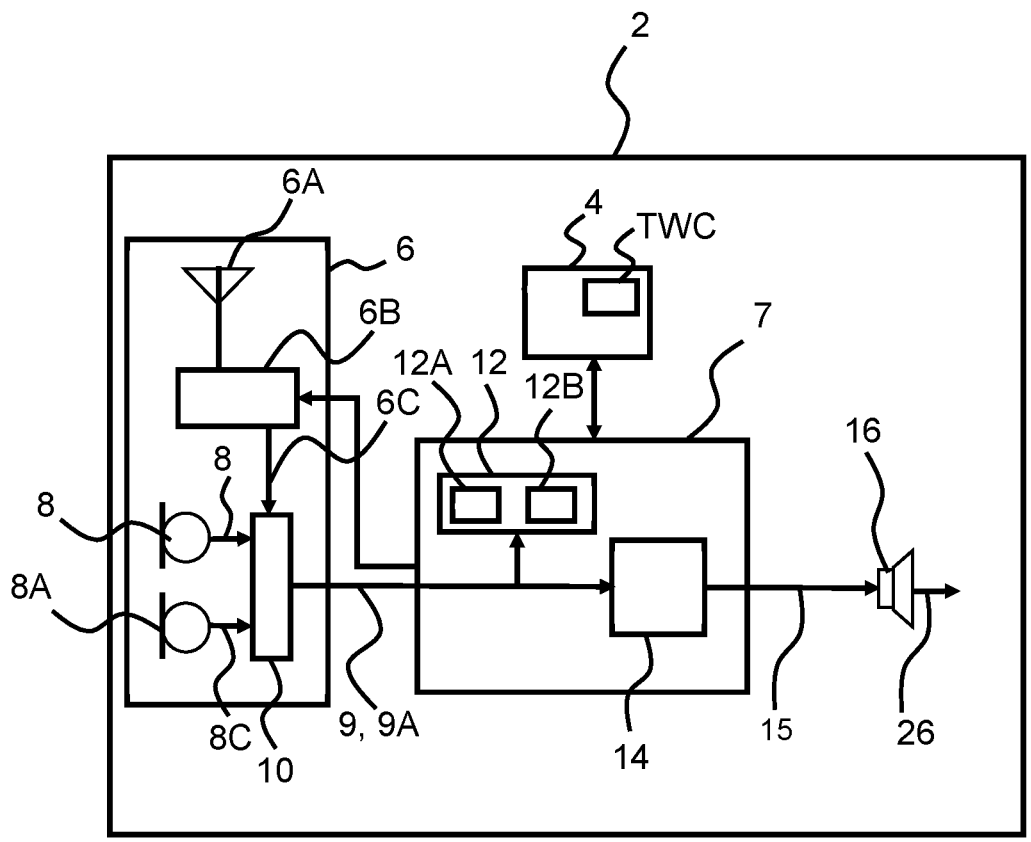
FIG. 1 is a block diagram of an exemplary hearing apparatus according to the disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing apparatus and related methods are disclosed. The hearing device may be configured for wireless communication with one or more devices, such as with another hearing device, e.g. as part of a binaural hearing system, and/or with one or more accessory/external devices, such as a smartphone and/or a smart watch.

The hearing apparatus/receiving unit optionally comprises an antenna and a radio transceiver coupled to the antenna for converting an antenna output signal to a transceiver input signal. Wireless signals from different external sources may be multiplexed in the radio transceiver to a transceiver input signal or provided as separate transceiver input signals on separate transceiver output terminals of the radio transceiver. The hearing apparatus may comprise a plurality of antennas and/or an antenna may be configured to be operate in one or a plurality of antenna modes.

The hearing apparatus/receiving unit comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal. The first speech signal may be based on the first microphone input signal and/or the second microphone input signal. The first speech signal may be based on the transceiver input signal. The hearing apparatus may comprise a mixing module for mixing input signals from microphones and/or radio transceiver.

The hearing apparatus comprises a processor for processing input signals including the first speech signal. The processor is optionally configured to compensate for hearing loss of a user of the hearing device. The processor provides an electrical output signal based on the input signals to the processor. Input terminal(s) of the processor are optionally connected to respective output terminals of the mixing module or to microphone output terminals of the respective microphones.

A method for operating a hearing apparatus is disclosed. The method comprises obtaining a first speech signal; determining a first word count of the first speech signal; updating a total word count based on the first word count; providing an electrical output signal based on the first speech signal; and converting the electrical output signal to an audio output signal. The total word count may comprise a number, such as a plurality, of total word count values. For example, the total word count may comprise total word counts associated with respective identities of persons being the sources of the speech signals. For example, the total word count may comprise total word counts associated with respective directions of arrival of the speech signals. The total word count may comprise one or more total word count(s) associated with respective intelligibility parameter ranges or values of the speech signals. The first speech signal may have a duration in the range from 0.1 s to 10 s. The total word count may be determined over a period of at least 30 minutes, such as at least 1 hour, at least 2 hours, or more. The method may be performed over a period of at least 30 minutes, such as at least 1 hour, at least 2 hours, or more.

In the method, determining a first/i'th word count based on the first/i'th speech signal may be performed in accordance with one or more criteria, e.g. selected from one or more identity criteria, one or more intelligibility criteria, one or more directional criteria, one or more position criteria, and one or more noise criteria, being satisfied. The index i is used to indicate a repeating word count procedure, see also FIG. 5 and corresponding description. The i'th element for i=1 denotes the first element, for example the i'th speech signal for i=1 denotes the first speech signal and the i'th word count for i=1 denotes the first word count.

In the method, updating a total word count based on the first/i'th word count may be performed in accordance with one or more criteria, e.g. selected from one or more identity criteria, one or more intelligibility criteria, one or more directional criteria, one or more position criteria, and one or more noise criteria, being satisfied.

In one or more exemplary methods, obtaining the first/i'th speech signal may comprise obtaining the first/i'th speech signal with a microphone module of the hearing apparatus. The method may comprise determining a first/i'th direction of arrival of the first/i'th speech signal, and determining a first/i'th word count of the first/i'th speech signal and/or updating the total word count is optionally based on the first/i'th direction of arrival. For example, determining a first/i'th word count of the first/i'th speech signal and/or updating the total word count may be performed in accordance with the first/i'th direction of arrival satisfying a direction criterion. The direction criterion may be satisfied if the first/i'th direction of arrival is within a first directional range, e.g. within ±45 degrees or within ±30 degrees of the zero direction (forward direction of the user). Thereby, the word count may only be determined/updated when the user is focused towards the source of the speech signal, e.g. allowing the user to look at the person/source of speech. In one or more exemplary methods, the total word count comprises a first directional total word count indicative of the number of words received from a person within a first directional range. Thus, updating the total word count may comprise updating a first directional total word count, e.g. in accordance with the first/i'th direction of arrival being within a first directional range. In the method, updating the total word count may comprise updating a second directional total word count, e.g. in accordance with the first/i'th direction of arrival being within a second directional range, e.g. outside the first directional range.

The method may comprise obtaining a second speech signal; optionally determining a second word count of the second speech signal; and updating the total word count based on the second word count, e.g. by adding the second word count to a current total word count. In the method, obtaining a second speech signal; optionally determining a second word count of the second speech signal; and updating the total word count based on the second word count, may be performed in accordance with a proceed criterion being satisfied or a stop criterion not being satisfied.

The method may comprise determining a first/i'th intelligibility parameter of the first/i'th speech signal. The first/i'th intelligibility parameter may be Speech Intelligibility Index (SII), short-time objective intelligibility (STOI) metric, the normalized covariance metric or other measure indicative of the intelligibility of the first speech signal. In the method, determining a first/i'th word count of the first speech signal is performed in accordance with the first/i'th intelligibility parameter satisfying an intelligibility criterion, e.g. if the first/i'th intelligibility parameter meets an intelligibility threshold. The method may comprise determining a second intelligibility parameter of the second speech signal. The second intelligibility parameter may be Speech Intelligibility Index (SII) or other measure indicative of the intelligibility of the second speech signal. In the method, determining a second word count of the second speech signal is optionally performed in accordance with the second intelligibility parameter satisfying an intelligibility criterion, e.g. if the second intelligibility parameter meets an intelligibility threshold. Accordingly, word count determination and/or update may only be performed, when the speech signal is understandable, in turn leading to a power-efficient hearing apparatus. Further, a total word count with improved relevance is provided.

The method may comprise determining an identity of the person being the source of the first/i'th speech signal, e.g. from a set of identities. The set of identities may comprise one, two, three, four, five or more identities. A limited set of identities may be preferred due to memory limitations in the hearing apparatus. Thus, the set of identities may consist of less than twenty or less than ten identities.

Determining an identity of the person being the source of the first/i'th speech signal may comprise parameterizing the first/i'th speech signal into one or more voice parameters, comparing the voice parameters with one or more pre-stored voice parameters associated with different identities of persons, and establishing the identity of the person being the source of the first/i'th speech signal based on the comparison of voice parameters. In other words, the one or more voice parameters may be mapped to an identity of the person being the source of the first/i'th speech signal, e.g. by use of a look-up table. Determining an identity of the person being the source of the first/i'th speech signal may comprise receiving the identity from an external device via a transceiver module of the hearing apparatus.

The total word count may comprise one or more total word counts, such as a first total word count and/or a second total word count each associated with an identity or a plurality of identities of the person(s) being the source of the first/i'th speech signal. In the method, updating a total word count based on the first/i'th word count may comprise updating a first total word count associated with a first identity in accordance with the identity being the first identity. Optionally, updating a total word count based on the first/i'th word count may comprise updating a second total word count associated with a second identity in accordance with the identity being the second identity. Thus, the total word count may comprise a first total word count associated with a first identity and/or a second total word count associated with a second identity. The first identity may be identity of the user of the hearing apparatus or a parent, such as mom or dad, of the user. The second identify may be a parent, such as mom or dad, or sibling of the user. It is to be noted that the number of identities employed may be one, two, three, four, or more. Optionally, updating a total word count based on the first/i'th word count may comprise updating a second total word count associated with a second identity in accordance with the identity being the second identity. In one or more exemplary methods, the total word count is not updated, if determining an identity fails, e.g. if the first/i'th speech signal does not match an identity in the set of identities. The set of identities may comprise an identity associated with persons not having an identity, i.e. an "others" identity. Accordingly, a third identity may be an identity of others.

In the method, updating a total word count may comprise storing the total word count or parts thereof in a memory of the hearing apparatus. The method may comprise, e.g. after updating the total word count, obtaining an additional speech signal, determining an additional word count of the additional speech signal, and updating the total word count with the additional word count. In the method, obtaining an additional speech signal, determining an additional word count of the additional speech signal, and updating the total word count with the additional word count may be performed in accordance with a stop criterion not being satisfied.

In one or more exemplary methods, obtaining the first/i'th speech signal comprises obtaining the first/i'th speech signal from an external device via a transceiver module of the hearing apparatus. The external device may transmit the identity of the person being the source of the first/i'th speech signal from the external device.

The method may comprise transmitting the total word count to an external device via the transceiver module, e.g. in response to receiving a word count request from the external device. The method comprises resetting the total word count, e.g. in response to receiving the word count request from the external device or in response to receiving a separate reset request from the external device. Resetting the total word count may comprise storing a reset time stamp indicative of the time of the last reset of the total word count.

Transmitting the total word count may comprise transmitting the reset time stamp to the external device.

In one or more exemplary methods, the method comprises determining a position of the hearing apparatus; and disabling determining a first/i'th word count of the first/i'th speech signal and/or updating the total word count if the position of the hearing device is not indicative of a position at the ear of the user, e.g. in accordance with a position criterion not being satisfied. Thereby is ensured that the total word count more precisely represents the number of words that are actually output to the user. Further, a more power-efficient hearing apparatus/method is provided for.

Also disclosed is a hearing apparatus comprising a receiving unit for obtaining a first/i'th speech signal; a processor configured for provision of an electrical output signal based on the first speech signal; and a receiver for converting the electrical output signal to an audio output signal, wherein the hearing apparatus is configured to perform the method as described herein.

A hearing apparatus comprising a receiving unit for obtaining a first/i'th speech signal; a processor configured for provision of an electrical output signal based on the first speech signal; and a receiver for converting the electrical output signal to an audio output signal is disclosed, wherein the processor is configured to determine a first/i'th word count of the first/i'th speech signal; update a total word count based on the first/i'th word count; and processing the first speech signal for provision of an electrical output signal.

Accordingly, the processor may comprise a counter module configured to configured to determine a first/i'th word count of the first/i'th speech signal; and optionally update a total word count based on the first/i'th word count. The processor may comprise an update module, e.g. as part of the counter module, configured to update the total word count based on the first/i'th word count.

The processor may comprise a processing unit or processing module for processing the first/i'th speech signal for provision of the electrical output signal to be converted by the receiver into an audio output signal.

The hearing apparatus may comprise a memory for storing the total word count in a memory of the hearing apparatus.

A method, e.g. for enhancing hearing experience for the hearing impaired is disclosed. The method comprises receiving a speech signal by means of a hearing apparatus, determining word count of the received speech signal, determining a total/cumulative word count associated with the speech signals received by the hearing apparatus, processing the received speech signal in the hearing apparatus, and reproducing the processed speech signal by means of a loudspeaker of the hearing apparatus.

The method may comprise receiving acoustic speech signal by means of a microphone of the hearing apparatus, and determining a direction of arrival of the received acoustic speech signal.

The method may comprise determining intelligibility of the received acoustic speech signal.

The method may comprise discontinuing determining of the word count in the received speech signal if the intelligibility of the received acoustic speech signal is inferior to a predetermined value.

The method may comprise determining the identity of the person delivering the acoustic speech signal.

The method may comprise parameterizing a voice of the person delivering the acoustic speech signal. The method may comprise comparing the obtained voice parameters with pre-stored voice parameters associated with different persons. The method may comprise, on the basis of the comparison, establishing identity of the person and/or of one or more persons delivering the acoustic speech signal. The method may comprise establishing identity of the person delivering the acoustic speech signal based on the obtained voice parameters.

The method may comprise, for each identified person, determining word count in the received speech signal, wherein said word count is associated with the identified person, and for each identified person, determining a total/cumulative word count.

The method may comprise, for one or more of the identified persons, determining word count in the received speech signal, wherein said word count is associated with the identified person, and for at least one or the identified persons, determining a total/cumulative word count.

The method may comprise receiving electric speech signal from a remote device having a microphone and being associated with a known speaker.

The method may comprise visualizing the obtained total/cumulative word count by means of an external device.

The method may comprise recording, by an external device having a microphone and being associated with a known speaker, the speech signal, and streaming the recorded electric speech signal to the hearing apparatus.

The method may comprise setting the total/total/cumulative word count to zero by means of an external device.

The method may comprise establishing position of the hearing apparatus, and optionally disabling determining of word count of the received speech signal if the hearing apparatus is not arranged at the ear of the hearing impaired.

The method may comprise capturing, by means of a microphone of the hearing apparatus, a speech signal produced by the hearing impaired, determining word count of the captured speech signal, and determining a total/cumulative word count associated with the captured speech signal.

FIG. 1 shows a block diagram of an exemplary hearing apparatus 2 according to the disclosure. The hearing apparatus 2 comprises a memory 4; a receiving unit 6 for obtaining a first speech signal 9 as part of an input signal 9A; a processor 7 configured for provision of an electrical output signal 15 based on the first speech signal 9/input signal 9A; and a receiver 16 for converting the electrical output signal 15 to an audio output signal 17. The processor 7 comprises a counter module 12 configured to determine a first word count, with word count module 12A, of the first speech signal 9 and update, with update module 12B, a total word count based on the first word count. The counter module 12 is configured to store the total word count TWC in memory 4 of the hearing apparatus 2. The processor 7 comprises processing module or unit 14 configured to process the first speech signal 9 for provision of an electrical output signal 15 according to a hearing compensation scheme, i.e. the processing unit 14 is configured to compensate for hearing loss of a user of the hearing apparatus 2.

The receiving unit 6 optionally comprises an antenna 6A and a radio transceiver 6B coupled to the antenna 6A for receiving wireless input signals in order to obtain a transceiver input signal 6C. The transceiver input signal may form at least part of the first speech signal. The receiving unit 6 comprises a set of microphones including a first microphone 8 and optionally a second microphone 8A for provision of first microphone input signal 8B and optionally second microphone input signal 8C, respectively. The first speech signal 9 is based on the first microphone input signal 8B and/or the second microphone input signal 8C. The first speech signal 9 may be based on the transceiver input signal 6C. The receiving unit 6 comprises a mixing module 10 for mixing, e.g. adding and/or filtering, input signals 6C, 8B, 8C for provision of first speech signal 9. The mixing module 10 may be implemented as part of processor 7.

Figure 2:
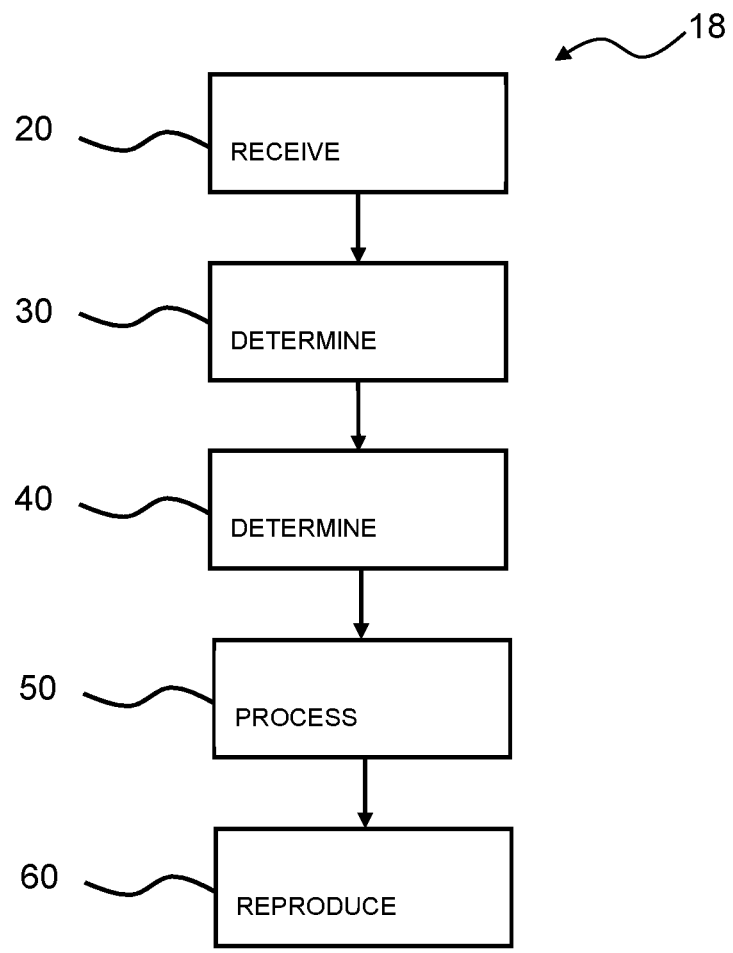
FIG. 2 shows a flow chart of the method for enhancing hearing experience according to one embodiment.

FIG. 2 shows a flow chart of the method for enhancing hearing experience for the hearing impaired according to an exemplary embodiment of the present disclosure. The method 18 comprises the steps of receiving 20 speech signal by means of a receiving unit belonging to a hearing apparatus, determining 30 word count of the received speech signal by means of a counter of the hearing apparatus, determining 40 a total/cumulative word count associated with the speech signals received by the hearing apparatus by means of a dedicated unit, employing 50 a processing unit of the hearing apparatus in order to process the received speech signal in the hearing apparatus and reproducing 60 the processed speech signal by means of a loudspeaker of the hearing apparatus.

Figure 3:
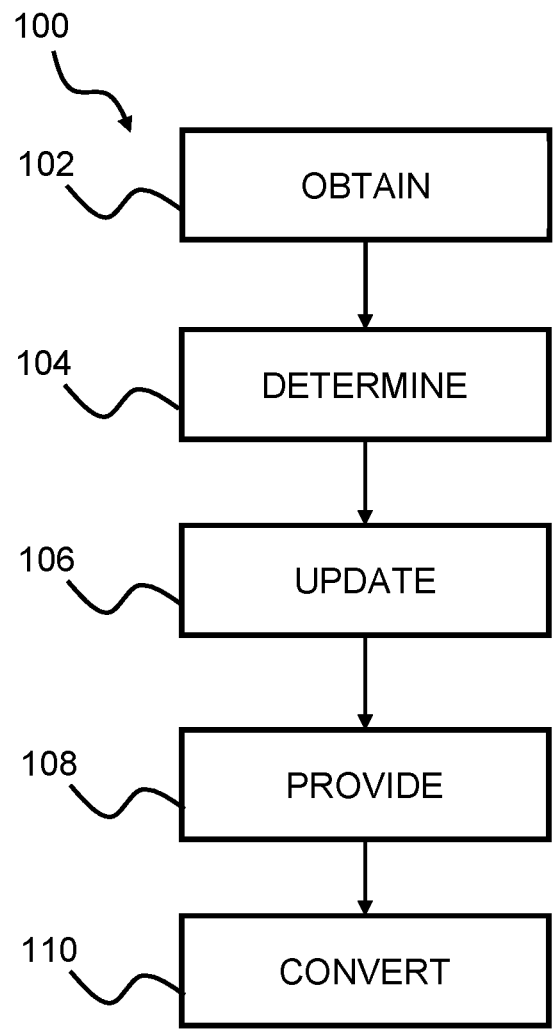
FIG. 3 shows a flow chart of an exemplary method for operating a hearing device.

FIG. 3 shows a flow chart of an exemplary method 100 for operating a hearing apparatus. The method 100 comprises obtaining 102 a first speech signal S_1 e.g. as a sample of an input signal from a receiving unit to a processor of the hearing apparatus; determining 104 a first word count WC_1 of the first speech signal S_1; and updating 106 a total word count TWC based on the first word count WC_1, e.g. by adding WC_1 to a previous TWC. The method 100 comprises providing 108 an electrical output signal based on the first speech signal/input signal; and converting 110 the electrical output signal to an audio output signal. The first speech signal may have a duration in the range from 0.1 s to 10 s. Method steps 104 and 106 may be performed in parallel to method steps 108 and 110.

Figure 4:
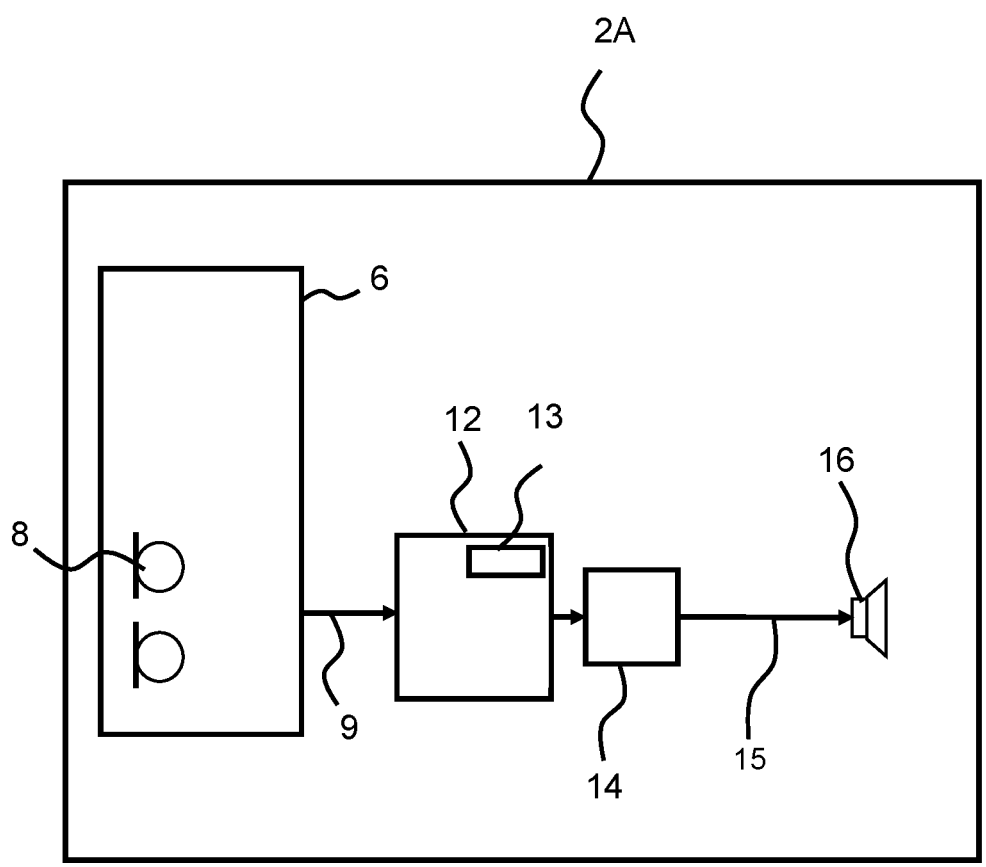
FIG. 4 is a block diagram of an exemplary hearing apparatus according to the disclosure.

FIG. 4 is a block diagram of an exemplary hearing apparatus 2 according to the disclosure. The hearing apparatus 2 comprises a receiving unit 6 for provision of an input signal 9. The receiving unit 6 comprises at least one microphone 8, 8A. The hearing apparatus 2 further comprises a counter module 12 for determining word count of the input signal 9, i.e. the received speech signal. The hearing apparatus 2 also has a unit 13 for determining a total/cumulative word count. This unit is in the shown example a part of the counter module 12. The hearing apparatus 2 further comprises a processing unit 14 for processing the received speech signal. The processing unit 14 provides an electrical output signal 15 based on the input signals to the processing unit 14. The hearing apparatus 2 also comprises a loudspeaker 16 for converting the electrical output signal to an audio output signal. The processing unit 14 is configured to compensate for a hearing loss of a person and to provide an electrical output signal 15 based on input signals. The loudspeaker 16 converts the electrical output signal 15 to an audio output signal to be directed towards an eardrum of the hearing-impaired person.

Figure 5:
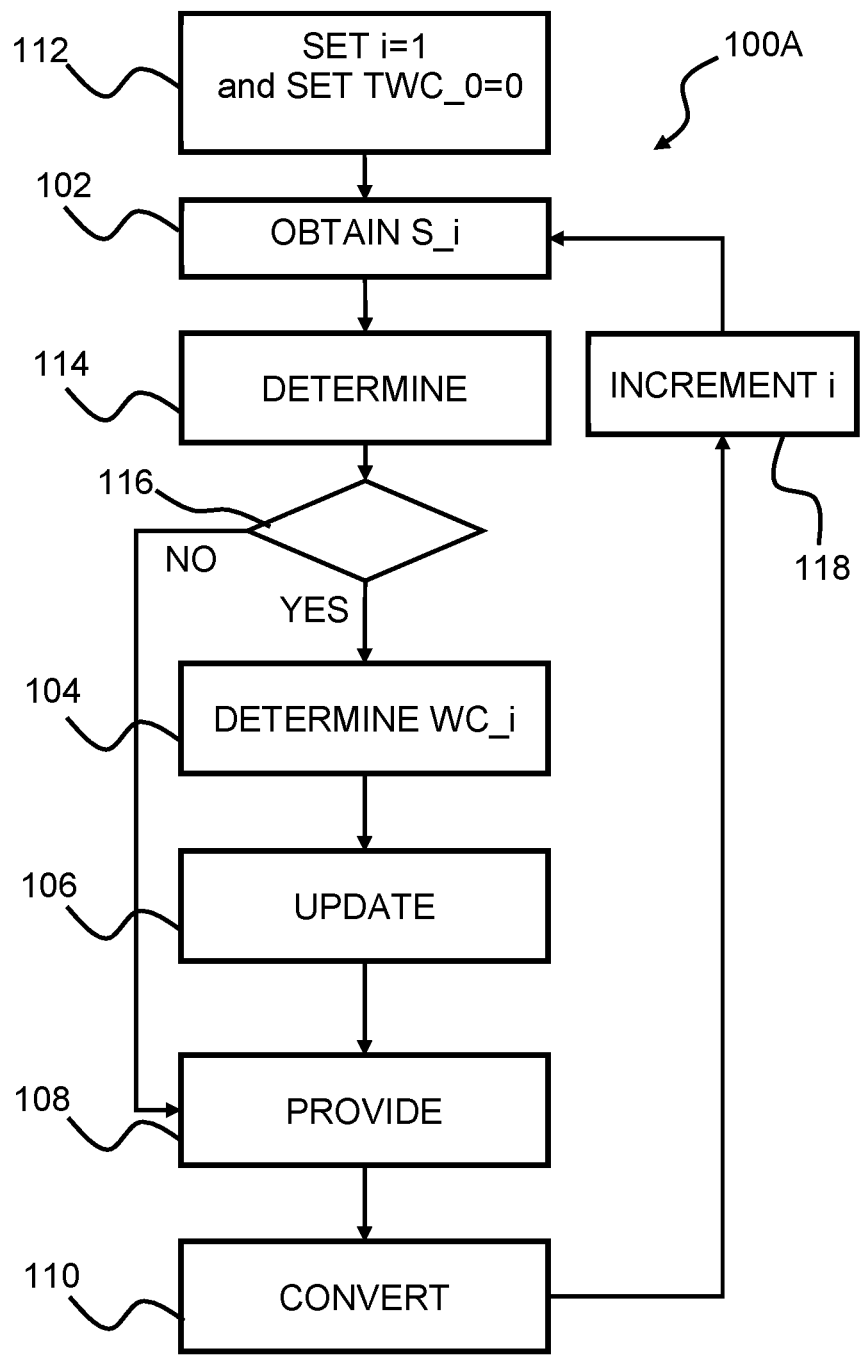
FIG. 5 shows a flow chart of an exemplary method for operating a hearing device.

FIG. 5 shows a more detailed example of an exemplary method according to the present disclosure. The method 100A for operating a hearing apparatus comprises resetting 112 an index i and/or the total word count TWC. The method comprises obtaining 102 an i'th speech signal S_i including first speech signal S_1, each speech signal S_i being a sample of an input signal from receiving unit to processor of the hearing apparatus and determining 114 one or more of an identity ID_i of the person being the source of the i'th speech signal, an i'th intelligibility parameter IP_i, such as SII, of the i'th speech signal, and an i'th direction of arrival DOA_i of the i'th speech signal. The method 100A comprises determining 116 whether one or more criteria, such as one or more direction criteria and/or one or more intelligibility criteria, are met/satisfied. Determining 116 whether one or more criteria are met/satisfied optionally comprises determining if an identity ID_i satisfies one or more identity criteria. Determining 104 word count WC_i optionally comprises determining word count WC_i in accordance with the one or more criteria being satisfied. Updating 106 the total TWC comprises updating TWC in accordance with the one or more criteria being satisfied.

The method 100A comprises providing 108 an electrical output signal based on the i'th speech signal/input signal; and converting 110 the electrical output signal to an audio output signal. The method 100A comprises incrementing 118 the index i and returning to obtaining 102 an i'th speech signal S_i, e.g. until a stop criterion is satisfied (not shown). The stop criterion may be satisfied when total word count has been determined for a period of time, e.g. for at least 30 minutes, 1 hour, 2 hours, or more. The i'th speech signal may have a duration in the range from 0.1 s to 10 s. Method steps 104 and 106 may be performed in parallel to method steps 108 and 110 when relevant.

Figure 6:
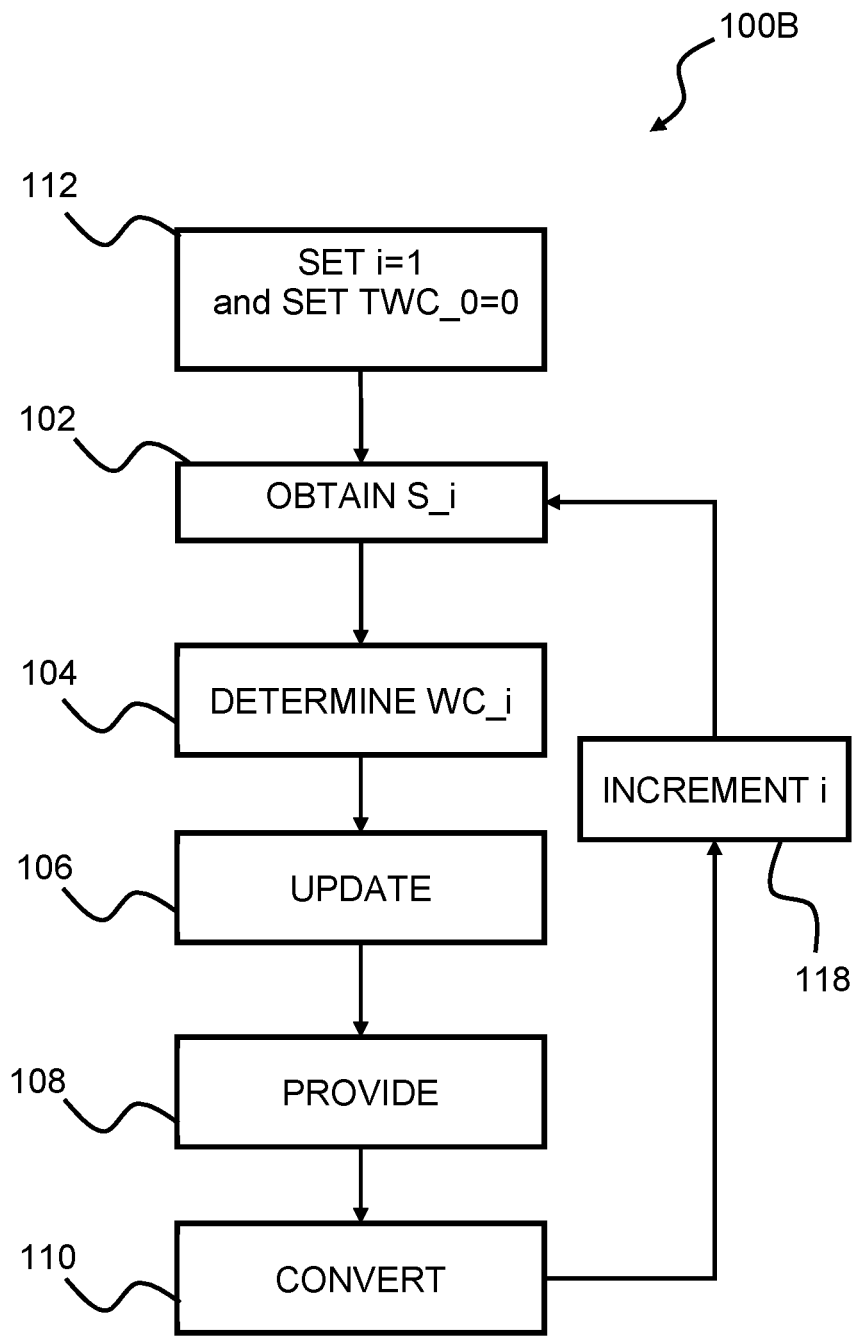
FIG. 6 shows a flow chart of an exemplary method for operating a hearing device.

FIG. 6 shows an example of an exemplary method according to the present disclosure. The method 100B for operating a hearing apparatus comprises resetting 112 an index i and/or the total word count TWC. The method comprises obtaining 102 an i'th speech signal S_i including first speech signal S_1, each speech signal S_i being a sample of an input signal from receiving unit to processor of the hearing apparatus and determining 104 word count WC_i of the i'th speech signal. Updating 106 the total TWC optionally comprises adding the i'th word count to the i−1'th total word count, e.g. TWC_i=WC_i+TWC_(i−1). Updating TWC may comprise overwriting the previous TWC in the memory of the hearing apparatus in order to effectively use the limited memory resources.

The method 100B comprises providing 108 an electrical output signal based on the i'th speech signal/input signal; and converting 110 the electrical output signal to an audio output signal. The method 100B comprises incrementing 118 the index i and returning to obtaining 102 an i'th speech signal S_i, e.g. until a stop criterion is satisfied. The stop criterion may be satisfied when total word count has been determined for a period of time, e.g. for at least 30 minutes, 1 hour, 2 hours, or more. The i'th speech signal may have a duration in the range from 0.1 s to 10 s. Method steps 104 and 106 may be performed in parallel to method steps 108 and 110 when relevant.

Figure 7:
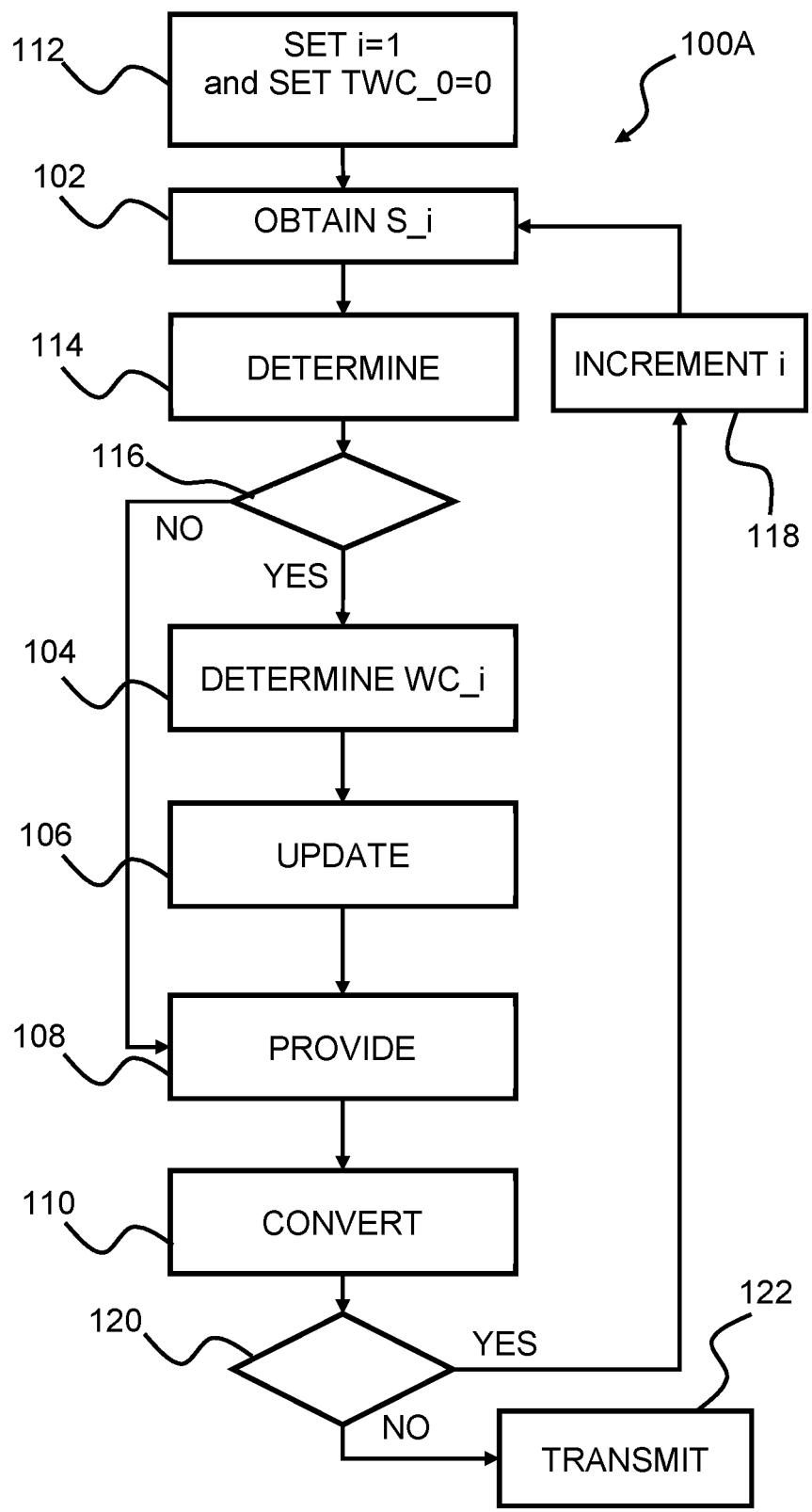
FIG. 7 shows a flow chart of an exemplary method for operating a hearing device.

FIG. 7 shows an example of an exemplary method according to the present disclosure. The method 100C comprises determining 120 if a proceed criterion is satisfied, and in accordance with the proceed criterion being satisfied, proceed to 118 of incrementing the index i. In accordance with the proceed criterion not being satisfied, the method 100C optionally proceeds to transmitting 122 the total word count to an external device, such as a mobile phone.

The present disclosure entails that the number of words which the user/the hearing-impaired child is exposed to may be tracked. Advantageously, the parents of the user/hearing-impaired child and/or hearing care professionals may hereby gain increased knowledge of one vital characteristic of the child's auditory day, namely the number of words (word count) that the user has been exposed to. In this way, it may be facilitated that the child develops language skills at a normal pace in spite of the impairment.

There are various ways to store the total/total/cumulative word count. Typically, the total/total/cumulative word count is stored using a conventional cloud solution. More specifically, the data may be transferred to the cloud storage either directly from memory of the hearing apparatus or with an aid of an intermediate device, for instance a mobile phone. As an alternative, the total/total/cumulative word count is optionally stored on a memory/memory unit being integrated in the hearing apparatus. This configuration offers significant advantages as it provides an autonomous solution. Further, the hearing apparatuses for children are inherently significantly less complex than their counterparts for adults. Particularly, many advanced features of modern hearing apparatuses, e.g. binaural functionality and telecoil, are redundant in the context of the hearing apparatus for children. Accordingly, spatial constraints associated with modern day hearing apparatuses become less severe. This opens for integration of dedicated memory units in children's hearing apparatuses for provision of word count capability.

In one or more embodiments, an acoustic speech signal is received by means of a microphone of the hearing apparatus, whereby a direction of arrival of the received acoustic speech signal may be determined. More specifically, well-known head-shadow effect results in a change of intensity level (interaural level difference; ILD) and time of arrival (interaural time difference; ITD) of the acoustic speech signal at the two ears. The ITD is recognized as a sound direction localization cue for sound content below 1500 Hz, whereas ILD has been identified as a sound direction localization cue for sound content above 1500 Hz. Using these cues, direction of arrival of the received acoustic speech signal may be obtained. Accordingly, the information on position of the speaker relative to the hearing-impaired could be used to evaluate pertinence of the received acoustic speech signal. Thus, acoustic speech signal arriving straight from the front should be assigned higher relevance than corresponding speech signal reaching the hearing apparatus from the side at an angle, e.g. less than −45 degrees or more than 45 degrees from the zero direction.

In one or more further embodiments, intelligibility of the received acoustic speech signal is determined. There are various methods to predict the speech intelligibility with acceptable reliability such as the short-time objective intelligibility (STOI) metric and the normalized covariance metric. Subsequently, determining of the word count in the received speech signal is discontinued if the intelligibility of the received acoustic speech signal is inferior to a predetermined value, typically a value between 0 and 1.

In one or more exemplary embodiments, the identity of the person delivering the acoustic speech signal may be determined. This could be done by parameterizing a voice of the person delivering the acoustic speech signal, and thereafter comparing the obtained voice parameters with pre-stored voice parameters associated with different persons, and finally on basis of the comparison, establishing identity of the person delivering the acoustic speech signal. One relevant voice parameter could be its pitch. The pitch of the voice is defined as the rate of vibration of the vocal folds. Other techniques used to parameterize the speaker's voice could be hidden Markov models or Gaussian mixture models.

In a related embodiment, for each identified person, the word count is associated with the identified person and added to the total/cumulative word count associated with that person. In this way, a more detailed statistics with respect to the person's auditory day may be obtained. For instance, the total/cumulative word count of a speech signal delivered by a particular person may be obtained. By way of example, the parents of the hearing impaired child may hereby keep track of their own total/cumulative word count. As is known, hearing parents' voices is of particular importance if the hearing-impaired children are to develop sufficient language skills.

In yet another embodiment, an electric speech signal from a remote device having a microphone is received. The remote device is associated with a known speaker. A total/cumulative word count associated with the speech signals received by the hearing apparatus is then determined. A remote device could be a so-called spouse microphone, used to supplement a hearing apparatus. The spouse microphone is worn by the child's parent or a teacher and is able to wirelessly communicate with the child's hearing apparatus. This enables the child to clearly understand speech at a distance or in situations with a lot of background noise as for example in school or kindergarten. Obviously, in this situation the process of determining the word count of the received speech signal differs from the process employed when acoustic speech signals are received by the microphone of the hearing apparatus. Nevertheless, the underlying principle and the purpose remain the same. Since the remote device is associated with a known speaker, typically a parent or a teacher, the identity of the person delivering the acoustic speech signal is automatically determined.

In one or more embodiments, the obtained total/cumulative word count is output, e.g. visualized on a display by means of an external device, such as a personal computer, a tablet or a cellular phone. By way of example, a mobile app that runs on a mobile device could be used for visualization. Here, word count data (total word count) is transferred from the hearing apparatus to the mobile device using conventional technologies, such as Bluetooth.

In further embodiment(s), the speech signal is recorded by an external device, such as a cellular phone, having a microphone and being associated with a known speaker. The recorded electric speech signal is thereafter streamed to the hearing apparatus. In this way, speakers, preferably parents, may create a library containing a number of audio files, e.g. goodnight stories, to be streamed to the child's hearing apparatus at bedtime. This streaming is then a very good substitute for the real-life bedtime storytelling. As these audio files may be replayed many times, this solution significantly alleviates the burden posed on the parents.

In an alternative or additionally, the total/cumulative word count is set to zero by means of an external device, such as a personal computer, a tablet or a cellular phone. This is typically done at the end of the day, immediately after the total/cumulative word count(s) for that particular day have been transferred and/or read. Alternatively, the hearing apparatus itself may set the total/cumulative word count to zero.

In yet another embodiment, position of the hearing apparatus is established. This may be done using different technologies, e.g. an integrated gyroscope and/or a temperature sensor. If it is determined that the hearing apparatus is not arranged at the ear of the hearing impaired then determining of word count of the received speech signal is disabled. In this way, the word count is not updated in situations where the hearing impaired is not wearing the hearing apparatus and hence cannot hear the speech signal. A more correct total/cumulative word count may hereby be obtained.

In further embodiment(s), a speech signal produced by the hearing impaired is captured by means of a microphone of the hearing apparatus, whereupon, word count of the captured speech signal is determined and a total/cumulative word count associated with the captured speech signal is finally determined. In this way, the parents of the hearing-impaired child and/or hearing care professionals may follow progression of the hearing-impaired child's speech. This is also an indirect indication whether the child is sufficiently exposed to spoken words—satisfactory speech development is virtually impossible if the child lacks adequate exposure to spoken words.

Also disclosed are methods and apparatus according to any of the following items.

Item 1. A method, e.g. for enhancing hearing experience for the hearing impaired, the method comprising the steps of:
  receiving (20) speech signal by means of a hearing apparatus,
  determining (30) word count of the received speech signal,
  determining (40) a total/cumulative word count associated with the speech
  signals received by the hearing apparatus,
  processing (50) the received speech signal in the hearing apparatus,
  reproducing (60) the processed speech signal by means of a loudspeaker of the hearing apparatus.

Item 2. A method in accordance with item 1, wherein the method further comprises the steps of:
  receiving acoustic speech signal by means of a microphone of the hearing apparatus, and
  determining a direction of arrival of the received acoustic speech signal.

Item 3. A method in accordance with item 1 or 2, wherein the method further comprises the step of:
  determining intelligibility of the received acoustic speech signal.

Item 4. A method in accordance with item 3, wherein the method further comprises the step of:
  discontinuing determining of the word count in the received speech signal if the intelligibility of the received acoustic speech signal is inferior to a predetermined value.

Item 5. A method in accordance with any of items 1-4, wherein the method further comprises the step of:
  determining the identity of the person delivering the acoustic speech signal.

Item 6. A method in accordance with item 5, wherein the method further comprises the steps of:
  parameterizing a voice of the person delivering the acoustic speech signal, and
  comparing the obtained voice parameters with pre-stored voice parameters associated with different persons, and
  on the basis of the comparison, establishing identity of the person delivering the acoustic speech signal.

Item 7. A method in accordance with item 6, wherein the method further comprises the steps of:
  for each identified person, determining word count in the received speech—
  signal, wherein said word count is associated with the identified person, and
  for each identified person, determining a total/cumulative word count.

Item 8. A method in accordance with any of items 1-7, wherein the method further comprises the step of:
  receiving electric speech signal from a remote device having a microphone and being associated with a known speaker.

Item 9. A method in accordance with any of items 1-8, wherein the method further comprises the step of:
  visualizing the obtained total/cumulative word count by means of an external device.

Item 10. A method in accordance with any of items 1-9, wherein the method further comprises the steps of:
  recording, by an external device having a microphone and being associated with a known speaker, the speech signal, and
  streaming the recorded electric speech signal to the hearing apparatus.

Item 11. A method in accordance with any of items 1-10, wherein the method further comprises the step of:
  setting the total/cumulative word count to zero by means of an external device.

Item 12. A method in accordance with any of items 1-11, wherein the method further comprises the steps of:
  establishing position of the hearing apparatus, and
  disabling determining of word count of the received speech signal if the hearing apparatus is not arranged at the ear of the hearing impaired.

Item 13. A method in accordance with any of items 1-12, wherein the method further comprises the steps of:
  capturing, by means of a microphone of the hearing apparatus, a speech signal produced by the hearing impaired,
  determining word count of the captured speech signal, and
  determining a total/cumulative word count associated with the captured speech signal.

Item 14. A hearing apparatus (2) comprising:
  a receiving unit (6) for receiving speech signal,
  a counter (12) for determining word count of the received speech signal,
  a unit (13) for determining a total/cumulative word count associated with the speech signals received by the hearing apparatus,
  a processing unit (14) for processing the received speech signal, and
  a loudspeaker (16) for reproducing the processed speech signal.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 2, 2A hearing apparatus
4 memory
6 receiving unit/input module
6A antenna
6B radio transceiver
6C transceiver input signal
7 processor
8 microphone, first microphone
8A second microphone
8B first microphone input signal
8C second microphone input signal
9 first speech signal
9A input signal
12 counter module
12A word count module
12B update module
13 unit for determining a total/cumulative word count
14 processing unit
15 electrical output signal
16 loudspeaker/receiver
17 audio output signal
18 method for enhancing hearing experience for the hearing impaired
20 receiving a speech signal
30 determining word count of the received speech signal
40 determining a total/cumulative word count associated with the speech signals
50 processing the received speech signal
60 reproducing the processed speech signal
100, 100A, 100B, 100C method for operating a hearing apparatus
102 obtaining a first/i'th speech signal
104 determining a first/i'th word count of the first/i'th speech signal
106 updating a total word count based on the first/i'th word count optionally in accordance with one or more criteria being satisfied
108 providing an electrical output signal based on the first/i'th speech signal 110 converting the electrical output signal to an audio output signal.
112 resetting an index i and/or the total word count
114 determining one or more of an identity of the person being the source of the i'th speech signal, an i'th intelligibility parameter of the i'th speech signal, and an i'th direction of arrival of the i'th speech signal
116 determining whether one or more criteria are satisfied
118 incrementing the index i
120 determining whether proceed criterion is satisfied
122 transmitting the total word count to external device

The invention claimed is:

1. A hearing apparatus comprising:
a receiving unit configured to obtain a first speech signal;
a processor configured to provide an electrical output signal based on the first speech signal; and
a receiver for providing an audio output signal based on the electrical output signal;
wherein the hearing apparatus is configured to determine a first word count of the first speech signal; and
wherein the receiving unit comprises a microphone module, wherein the hearing apparatus is configured to determine a first direction of arrival of the first speech signal, and wherein the hearing apparatus is configured to update a total word count based on the first direction of arrival.

2. A hearing apparatus comprising:
a receiving unit configured to obtain a first speech signal;
a processor configured to provide an electrical output signal based on the first speech signal; and
a receiver for providing an audio output signal based on the electrical output signal;
wherein the hearing apparatus is configured to determine a claim first word count of the first speech signal based on the first speech signal obtained by the receiving unit of the hearing apparatus; and
wherein the hearing apparatus is configured to determine a first intelligibility parameter of the first speech signal, and wherein the hearing apparatus is configured to determine the first word count of the first speech signal based on the first intelligibility satisfying an intelligibility criterion.

3. The hearing apparatus according to claim 2, wherein the receiving unit is configured to obtain a second speech signal, and wherein the hearing apparatus is configured to determine a second word count of the second speech signal.

4. The hearing apparatus according to claim 2, wherein the hearing apparatus is configured to determine an identity of a person that is a source of the first speech signal.

5. The hearing apparatus according to claim 4, wherein the hearing apparatus is configured to update a total word count by updating a first total speech-word count associated with a first identity if the identity of the person is the first identity, or by updating a second total speech-word count associated with a second identity if the identity of the person is the second identity.

6. The hearing apparatus according to claim 5, wherein the first identity is an identity of a user of the hearing apparatus.

7. The hearing apparatus according to claim 5, wherein the second identify is an identity of a parent of the user.

8. The hearing apparatus according to claim 4, wherein the hearing apparatus is configured to determine the identity of the person by:
parameterizing the first speech signal into one or more voice parameters;
comparing the one or more voice parameters with pre-stored voice parameters associated with different identities of persons; and
establishing the identity of the person being the source of the first speech signal based on a result from the comparing.

9. The hearing apparatus according to claim 2, wherein the receiving unit comprises a transceiver module configured to obtain the first speech signal from an external device.

10. The hearing apparatus according to claim 2, wherein the hearing apparatus further comprises a transceiver module configured to transmit a total word count to an external device; or
wherein the receiving unit is a part of the transceiver module.

11. The hearing apparatus according to claim 2, wherein the hearing apparatus is configured to reset a total word count.

12. A hearing apparatus comprising:
a receiving unit configured to obtain a first speech signal;
a processor configured to provide an electrical output signal based on the first speech signal; and
a receiver for providing an audio output signal based on the electrical output signal;
wherein the hearing apparatus is configured to determine a first word count of the first speech signal; and
wherein the hearing apparatus is configured to determine a position of the hearing apparatus, and cease determining the first word count of the first speech signal if the position of the hearing apparatus is not indicative of a position at an ear of a user of the hearing apparatus.

13. A method performed by a hearing apparatus, comprising:
obtaining a first speech signal;
determining a first word count of the first speech signal;
updating a total word count based on the first word count;
providing an electrical output signal based on the first speech signal; and
converting the electrical output signal to an audio output signal;
wherein the act of obtaining the first speech signal is performed by a microphone module of the hearing apparatus, and wherein the method comprises determining a first direction of arrival of the first speech signal, and wherein the act of updating the total word count is performed based on the first direction of arrival.

14. A method performed by a hearing apparatus, comprising:
obtaining a first speech signal;
determining a first word count of the first speech signal;
providing an electrical output signal based on the first speech signal obtained by the hearing apparatus; and
converting the electrical output signal to an audio output signal;
wherein the method further comprises determining a first intelligibility parameter of the first speech signal, wherein the act of determining the first word count of the first speech signal is performed based on the first intelligibility satisfying an intelligibility criterion.

15. The method according to claim 14, further comprising:
obtaining a second speech signal;
determining a second word count of the second speech signal; and
updating a total word count based on the second word count.

16. The method according to claim 14, further comprising determining an identity of a person that is a source of the first speech signal.

17. The method according to claim 16, further comprising updating a total word count, wherein the act of updating the total word count comprises updating a first total speech-word count associated with a first identity if the identity of the person is the first identity, or updating a second total speech-word count associated with a second identity if the identity of the person is the second identity.

18. The method according to claim 17, wherein the first identity is an identity of a user of the hearing apparatus.

19. The method according to claim 17, wherein the second identify is an identity of a parent of the user.

20. The method according to claim 16, wherein the act of determining the identity of the person comprises:
- parameterizing the first speech signal into one or more voice parameters;
- comparing the one or more voice parameters with pre-stored voice parameters associated with different identities of persons; and
- establishing the identity of the person being the source of the first speech signal based on a result from the act of comparing.

21. The method according to claim 14, wherein the act of obtaining the first speech signal comprises obtaining the first speech signal from an external device via a transceiver module of the hearing apparatus.

22. The method according to claim 14, further comprising transmitting a total word count to an external device via a transceiver module.

23. The method according to claim 14, further comprising resetting a total word count.

24. A method performed by a hearing apparatus, comprising:
- obtaining a first speech signal;
- determining a first word count of the first speech signal;
- updating a total word count based on the first word count;
- providing an electrical output signal based on the first speech signal;
- converting the electrical output signal to an audio output signal;
- determining a position of the hearing apparatus; and
- disabling the act of determining the first word count of the first speech signal if the position of the hearing apparatus is not indicative of a position at an ear of a user of the hearing apparatus.

* * * * *